Sept. 27, 1966    J. R. TIMBERLAKE ETAL    3,275,115
CLUTCH
Original Filed Nov. 21, 1961
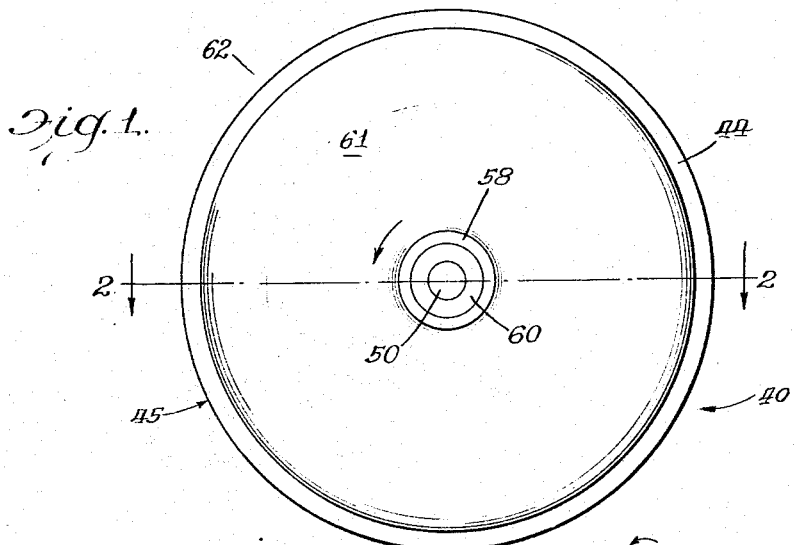
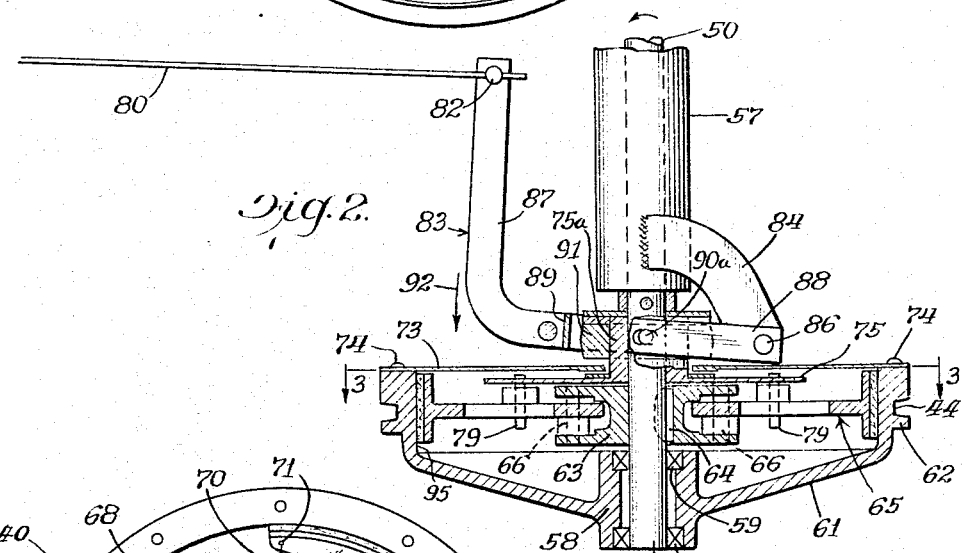
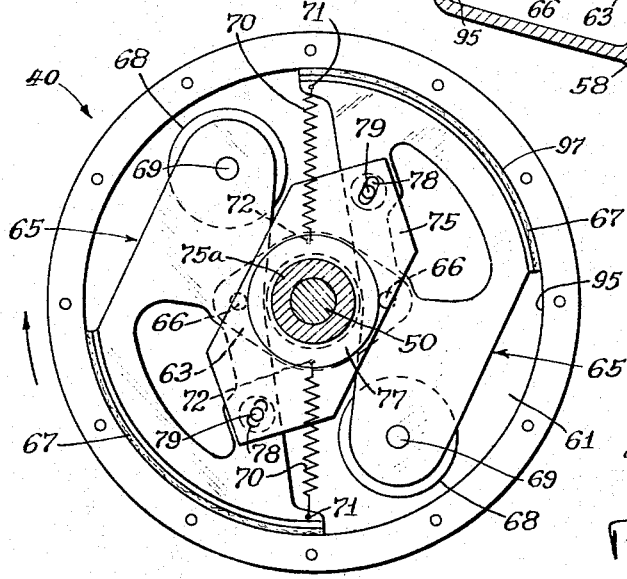
INVENTORS.
John R. Timberlake
Harvey O. Halstensgard
Arlie J. Thayer
Paul O. Pippel
Atty.

United States Patent Office 3,275,115
Patented Sept. 27, 1966

3,275,115
CLUTCH
John R. Timberlake, Downers Grove, Ill., Harvey O. Halstensgard, La Habra, Calif., and Arlie J. Thayer, Brookfield, Ill., assignors to International Harvester Company, a corporation of Delaware
Continuation of abandoned application Ser. No. 153,830, Nov. 21, 1961. This application Jan. 27, 1965, Ser. No. 440,974
3 Claims. (Cl. 192—75)

This application relates to a new and useful clutch and is a continuation of my copending application Serial No. 153,830 filed November 21, 1961, which is now abandoned.

An important object of this invention is to provide a clutch which locks upon being engaged and which then unlocks when a predetermined speed is attained to terminate the operating cycle.

Another important object of this invention is to equip a clutch with two frictionally engaging elements wherein actuation of one frictionally engaging element automatically causes an engagement of the other element to effect a clutching action.

Still another important object of this invention is the provision of a clutch for an intermittently operated bale thrower wherein the clutch automatically terminates the bale thrower operating cycle after a predetermined period of operation.

Other and further important objects and advantages will become apparent from the following specification and accompanying drawings.

In the drawings:

FIGURE 1 is an end elevational view of the clutch of this invention.

FIGURE 2 is a sectional view taken on the line 2—2 of FIGURE 1.

FIGURE 3 is an end view of the clutch with the cover plate removed, taken on the line 3—3 of FIGURE 2.

As shown in the drawings:

The reference numeral 40 indicates generally the clutch of this invention. The clutch is driven through a V-pulley groove 44 formed in the outer periphery of a drum member 45. Thus the member 45 constitutes the driving part of the clutch 40. The clutch is of an intermittently operable type and is usable in conjunction with devices such as a bale thrower.

The drum member or housing 45 is journalled on shaft 50. As best shown in FIGURE 2, the shaft 50 is journally mounted within a stationary tube or supporting sleeve 57. The drum member 45 is provided with a hub 58 which is mounted on spaced bearings 59 and 60 journalled on the outer end of the shaft 50. Tube 57 and shaft 50 provide, therefore, a supporting structure for drum member 45. Thus drive may be continuously imparted to the drum member 45 through engagement of a belt or the like (not shown) with the V-pulley 44 without directly imparting rotational drive to the shaft 50. The drum member 45 is equipped wtih a generally radially disposed outwardly projecting flange or spider 61 and an axially extending flange or rim 62 on which the V-pulley 44 is formed. The rim 62 gives the member 45 its drum shape from which it is identified. The inner surface 95 of the rim 62 acts as an annular friction driving surface to effect actuation of the clutch 40, which will now be described in detail.

A hub 63 is attached by means of a pin or the like 64 to the shaft 50. Thus the hub 63 moves and rotates with the shaft 50 when it is rotated. An arm 65 is pivotally attached intermediate its ends at 66 on hub 63. One end of the arm 65 is provided with an arcuate clutch shoe 67. The shoe 67 has a driven surface 97 normally positioned closely adjacent to the internal surface 95 of the rim 62 of the drum member 45. The other end of the arm 65 constitutes a counterweight 68. As shown herein counterweights 68 are carried on and about a center 69. The hub 58 of the drum member is axially offset from the rim 62 so that the hub 63 may be disposed in planar alignment with the rim 62. A spring 70 having one end fastened at 71 to the end of the clutch shoe 67 and its other end fasened at 72 to the hub 63 normally urges the clutch shoe away from engagement with the inner surface 95 of the rim. An outward movement of the clutch shoe 67 against the action of the spring 70 causes the shoe 67 to engage the drum 45 and thereby carry drive from the drum down to the arm 65 and through the hub 63 to the shaft 50. The positioning of the pivot point 66 inwardly of the inner surface of the drum causes the engagement of the clutch to be self-energizing when drum member 45 rotates clockwise relative to FIG. 3. The degree of self-energizing depends upon the position of the pivot from the circumference of the friction engaging surface of the drum. At some point away from the drum the clutch becomes self-locking after an initial actuating urge. It is a function of the present clutch to be self-locking in order to have the full benefit of the driving force act immediately upon clutch engagement. Drive is now imparted from the drum member 45 to shaft 50.

The means for effecting an outward movement of the clutch shoe 67 and of the arm 65 includes a radially, inwardly projecting, flexible sheet metal skirt 73 which is fastened by means of screws or the like 74 to the rim 62. The clutch actuator means further includes a plate 75 which is journally mounted on the shaft 50 by means of hub 75a at a position adjacent to the hub 63. The plate 75 may be termed a self-locking clutch actuator. Annular friction surfaces 76 and 77 are provided on the skirt 73 and plate 75, respectively. There is normally a slight space between these cooperating friction faces 76 and 77 whereby drive from one to the other is prevented. It should be understood that as the drum member 45 continuously rotates, so does the annular friction face 76 on the flexible skirt 73. The plate 75 is normally stationary relative to the shaft 50 and thus when a momentary axial movement is applied to the flexible skirt 73 the friction faces 76 and 77 engage to thereby deliver rotation to the plate 75.

As shown in FIGURE 3, the plate 75 is provided with a generally radially disposed elongated slot 78. A pin 79 carried by the rocker arm 65 loosely engages the elongated slot 78. Now when rotational drive is imparted to the plate 75 it imparts a corresponding initial rotation to the arm 65. This initial rotation of the arm 65 through the medium of the plate 75 engaging the arm by the pin 79 and resistance to the rotation of the hub 63 by a load to be driven causes an initial outward movement of the clutch shoe 67 about its hinge 66, thereupon causing the clutch shoe 67 to initially engage the inner annular surface of the drum rim 62. The self-locking geometry explained above then provides for the rotation of all of the elements as a unit with the drum member 45.

During operation of the clutch, the counterweights 68 are thrown outwardly by centrifugal force created by rotation of the unit. The rocker arm 65 swings about its pivot 66 drawing the clutch shoe 67 away from surface 95 of rim 62. Disengagement of the clutch is, of course, dependent upon prior disengagement of the friction surfaces 76 and 77. There is a necessary and desirable balance between the self-locking action and the self-deenergizing action. Thus the clutch is an intermittently operable clutch which is self-deenergizing after the load is removed and the clutch comes up to some predetermined speed.

The means for deflecting the flexible skirt 73 to initially impart rotation to the self-locking clutch actuator 75 is accomplished by the pulling of a cable or the like 80. The cable 80 is fastened at 82 to a bellcrank lever 83. An arm member 84 is welded or otherwise fastened at 85 to the sleeve support 57. The bellcrank 83 is pivoted at 86 to the outer end of the arm 84. The bellcrank 83 includes a generally transversely disposed arm 87 and a generally longitudinally extending arm 88 disposed at right angles theerto. The hing 86 of the bellcrank is located at one end of the arm 88. The arm 88 is provided with a fork 89 intermediate its ends for the purpose of engaging diametricaly opposed pins 90 and 90a on the axially shiftable trunnion member 91.

In the operation of the clutch of this invention the cable 80 is pulled, causing the bellcrank 83 to be swung about its hinge 86 on the stationary supporting bracket 84, thus producing an inward or lateral movement of the trunnion member 91 which flexes the inwardly projecting annular skirt 73 for effecting engagement of the friction surfaces 76 and 77. The annular flexible skirt 73 is continuously driven and engagement of the friction face 76 of the skirt 73 imparts drive to the plate member 75 through its friction face 77. The plate 75 through the medium of the slot 78 and pin 79 urges the clutch shoe 67 outwardly for engagement of surface 97 with the inner surface 95 of the rim 62. Now drive is complete from the member 45 down through the rocker arm 65 to the bushing 63 and, thus to the shaft 50. After engagement of the clutch shoe 67 and the arm 65 reaches rotational speed and the load (pull) on cable 80 is removed, the counterweights 68 swing outwardly by centrifugal force to cause a prompt disengagement of the clutch shoe 67 with the driven rim 62.

We are aware that numerous details of construction may be varied throughout a wide range without departing from the principles disclosed herein, and we therefore do not propose limiting the patent granted hereon otherwise than as necessitated by the appended claims.

What is claimed is:

1. A self-locking and self-unlocking clutch for an intermittently operated machine such as a bale thrower wherein the clutch automatically locks in engaged position after actuation and automatically unlocks to terminate the machine operating cycle after a predetermined period of operation, comprising: a supporting structure for said clutch, said supporting structure including a rotary drive shaft forming a clutch driven member, a clutch driving member having a driving surface, said clutch driving member being mounted for rotation on said supporting structure, a hub fastened on said drive shaft for rotation therewith, a clutch arm having a driven surface at one end thereof and a counterweight at the other end thereof, means pivotally mounting said clutch arm on said hub intermediate said driven surface and said counterweight, said clutch arm being pivotal between a first position wherein said driving member driving surface and said clutch arm driven surface are disengaged and a second position wherein said driving member driving surface and said clutch arm driven surface are engaged to form a driving connection between said clutch driving member and said clutch driven member, said pivotal mounting means being located with respect to said driving member driving surface to lock said clutch arm in said second position when said driving member driving surface and said clutch arm driven surface are engaged to form said driving connection, said counterweight being located with respect to said pivotal mounting means to produce a centrifugal force for unlocking said clutch arm from said second position and moving it to said first position to completely break said driving connection between said clutch driving member and said clutch driven member to terminate an operating cycle of said intermittently operated machine after a predetermined period of operation, actuating means joined to said clutch arm for pivoting it from said first position to said second position, cycle initiating means on said supporting structure for applying a force to said actuating means, said cycle initiating means being rendered inactive after application of said force to enable said actuating means and said clutch arm to return to said first position when said counterweight produces said centrifugal force.

2. A clutch as recited in claim 1, wherein: said clutch driving member comprises a drum member having a sleeve journalled on said drive shaft, an annular flange projecting radially from said sleeve, an annular rim on said flange, said annular rim having an interior cylindrical surface forming said driving member driving surface, said actuating means comprising a flexible skirt attached to said annular rim, a plate on said drive shaft intermediate said hub and said flexible skirt, a slot in said plate, and a pin carried by said clutch arm engaging said slot.

3. A clutch as recited in claim 2, wherein: said cycle initiating means comprises an arm member attached to said supporting structure, a bellcrank pivotally mounted on said arm member, a trunnion member slidable on said drive shaft adjacent said flexible skirt, pin means connecting said bellcrank and said trunnion, and an operating cable attached to said bellcrank.

References Cited by the Examiner

UNITED STATES PATENTS

| | | | |
|---|---|---|---|
| 1,126,124 | 1/1915 | Strite | 192—104 |
| 1,418,350 | 6/1922 | Asplund | 192—104 |
| 1,585,906 | 5/1926 | Master | 192—75 |
| 1,821,499 | 9/1931 | Culver | 192—35 X |
| 1,925,897 | 9/1933 | Fawick | 192—35 |
| 2,136,381 | 11/1938 | Hile | 192—75 |
| 2,197,522 | 4/1940 | Ferguson et al. | 192—75 |

DAVID J. WILLIAMOWSKY, *Primary Examiner.*

B. W. WYCHE, III, *Assistant Examiner.*